June 11, 1940.  H. ARMSTRONG  2,204,115
SEED HARVESTER
Filed July 29, 1939    3 Sheets-Sheet 1
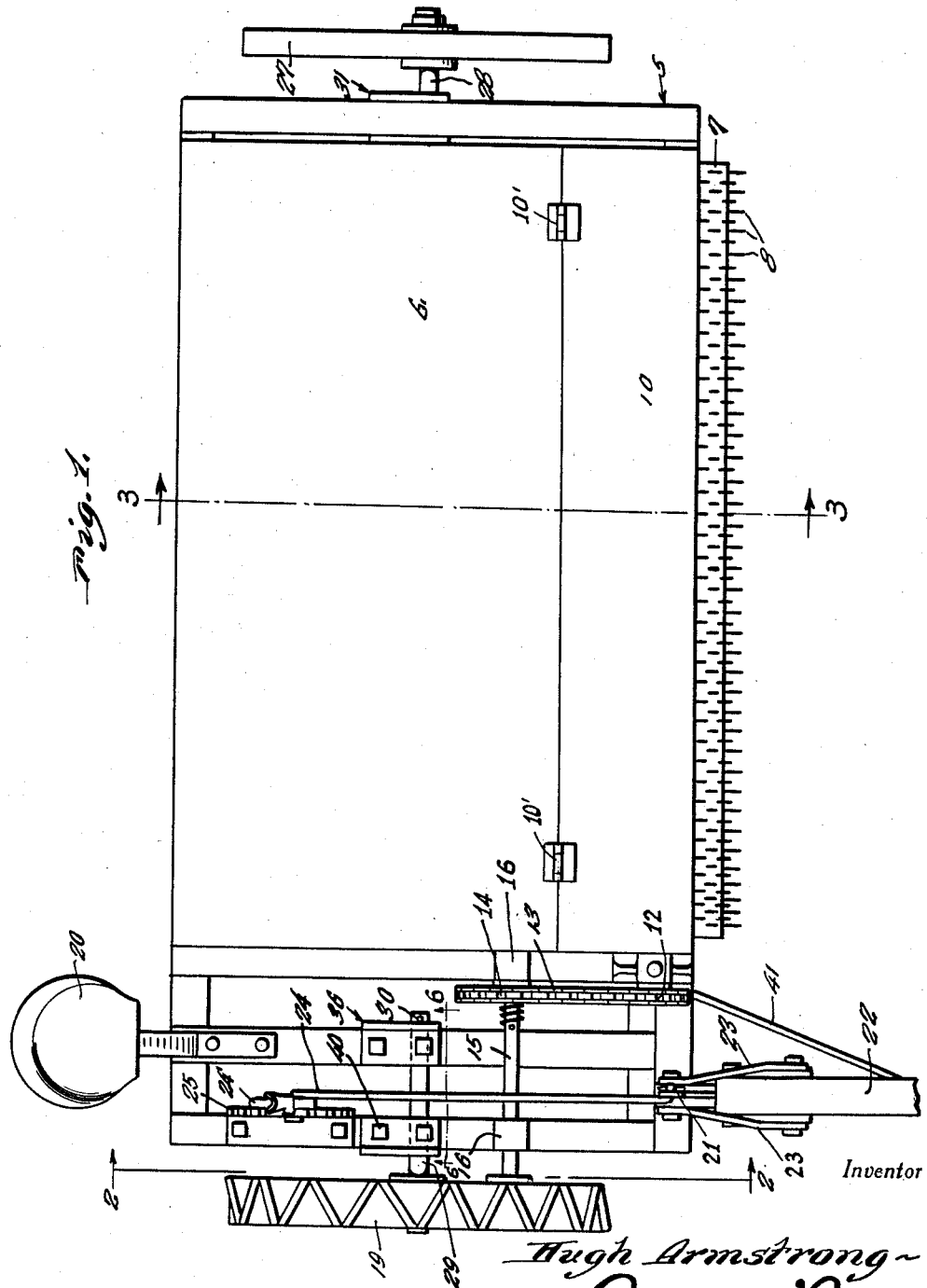
Inventor
Hugh Armstrong
By Clarence A. O'Brien
and Hyman Berman
Attorneys

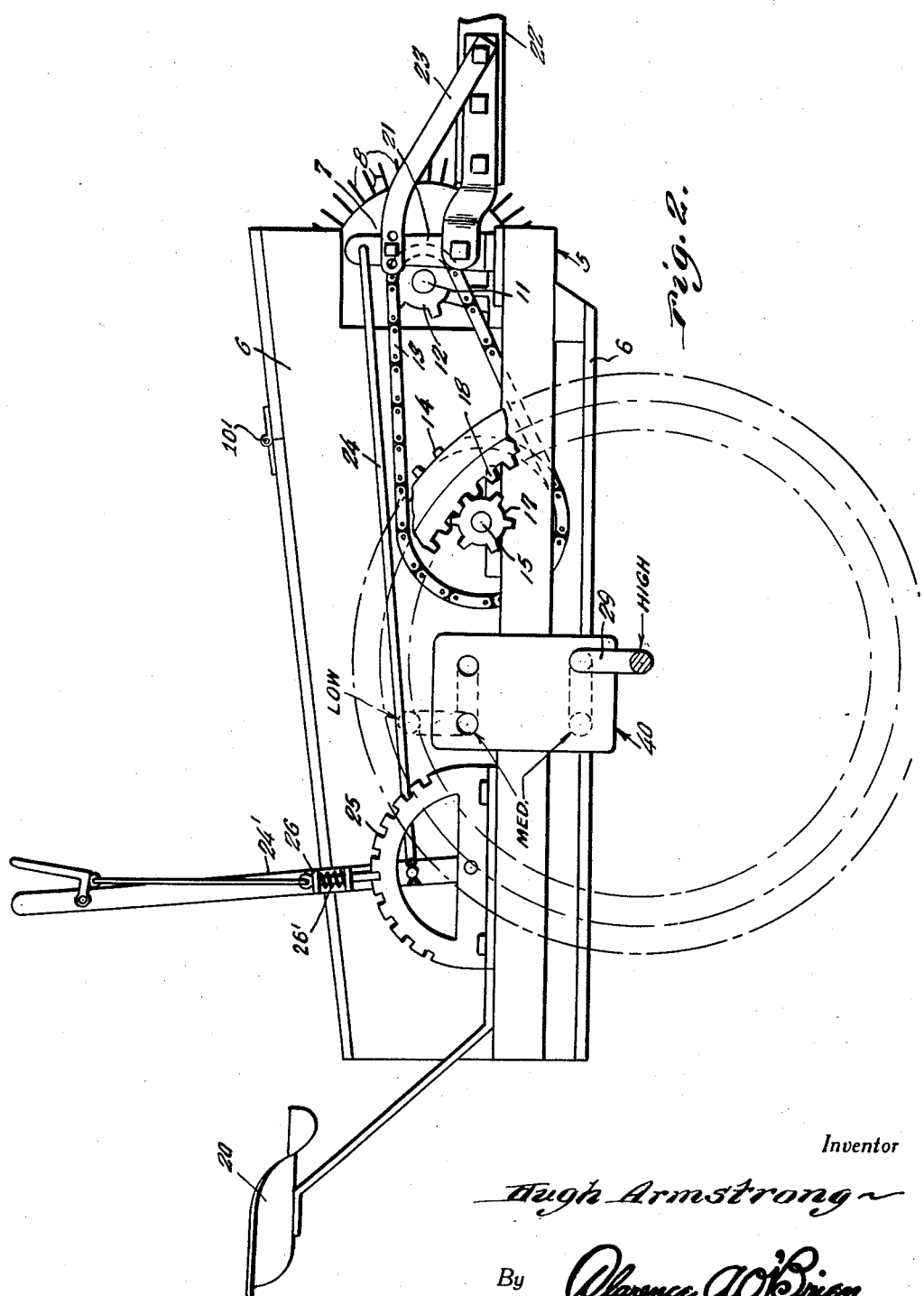

June 11, 1940.  H. ARMSTRONG  2,204,115
SEED HARVESTER
Filed July 29, 1939   3 Sheets-Sheet 3
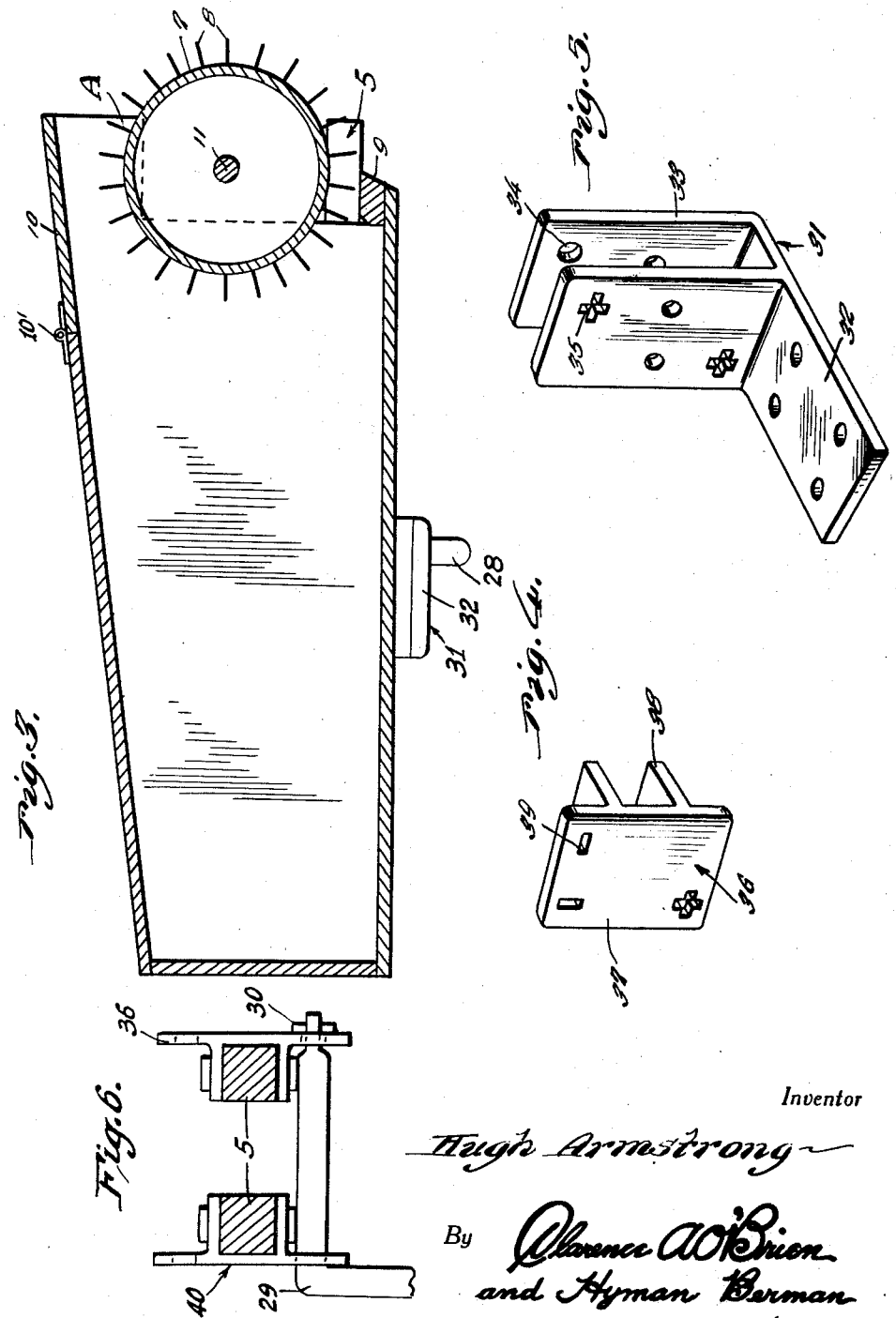
Inventor
Hugh Armstrong
By Clarence A. O'Brien
and Hyman Berman
Attorneys Patented June 11, 1940

2,204,115

UNITED STATES PATENT OFFICE 2,204,115

SEED HARVESTER

Hugh Armstrong, Maryville, Mo.

Application July 29, 1939, Serial No. 287,419

2 Claims. (Cl. 56—130)

This invention relates to a seed harvester of the type employing a seed box, stripper cylinder and stripper bar, and has for the primary object the provision of a device of this character which may be readily adjusted to strip grass and similar growth of seeds wherein the range of the height of said grass or growth varies to assure of efficient gathering of the seed without undue waste, the construction being such, that the stripper bar and mouth of the seed box may be maintained substantially horizontally during the various adjustments of the device relative to elevation which assure proper functioning of the cylinder and stripper bar on the grass or other growth to remove the seed and gather them in the seed box.

Another object of this invention is the provision of means which will permit the raising and lowering of the device between the highest and lowest extremities to be easily and rapidly carried out and which will permit the wheels and axles of the device to be easily removed, thereby the elimination of such parts as obstructions and their weight renders the device comparatively easy to load and unload from a motor truck or similar conveyance.

With these and other objects in view, the invention consists in certain novel features of construction, combination and arrangement of parts to be hereinafter more fully described and claimed.

For a complete understanding of my invention, reference is to be had to the following description and accompanying drawings, in which Figure 1 is a top plan view illustrating a seed harvester constructed in accordance with my invention.

Figure 2 is a sectional view taken on the line 2—2 of Figure 1.

Figure 3 is a transverse sectional view taken on the line 3—3 of Figure 1, illustrating the seed box, stripper cylinder and stripper bar.

Figure 4 is a perspective view illustrating one of the brackets for the mounting of one of the axles.

Figure 5 is a perspective view illustrating another bracket for the mounting of the other axle of the device.

Figure 6 is a detail transverse sectional view taken on the line 6—6 of Figure 1.

Referring in detail to the drawings, the numeral 5 indicates a main frame of substantially rectangular shape and has mounted on a portion thereof a seed box 6, the front wall of which is fully open to form a mouth A and journaled to operate within the mouth of the seed box is a stripper cylinder 7 including a plurality of teeth or tines 8 on the periphery thereof. As will be seen in Figure 2 as well as Figure 1, a portion of the cylinder projects beyond the mouth and coacts with a stripper bar 9 mounted on the bottom wall of the seed box at the mouth in stripping grass or similar growth of seed and passing said seeds rearwardly into the box.

The box in its top wall over the stripper cylinder is provided with a cover 10 secured in place by hinges 10'. The cylinder is secured on a shaft 11 which is journaled in bearings provided in the walls of the box and one end of said shaft projects outwardly of the box and has secured thereto a sprocket gear 12 over which is trained a sprocket chain 13. The sprocket chain also is trained over a sprocket gear 14 secured on a shaft 15 journaled in bearings 16 on the frame 5. One end of the shaft 15 projects beyond one end of the frame and has secured thereon a gear 17 to mesh with a ring gear 18 forming a part of a bull wheel 19. Thus by the forward motion of the device the bull wheel drives the stripper cylinder.

The frame 5, at one end of the seed box, is equipped with a seat 20 for the operator. Also pivotally secured on the frame laterally of one end of the seed box is an arm 21 and a draft tongue 22. This tongue is adapted to be connected to a draft source such as a tractor (not shown). Braces 23 extend between the draft tongue 22 and the bracket 21. A connecting link 24 is pivoted to the upper end of the arm 21 and to an elevating lever 24' of the manually actuated type and which is pivoted on a quadrant 25 mounted on the frame 5 adjacent the seat 20. A detent 26 of the spring influenced type is carried by the hand lever 24' for coaction with the teeth of the quadrant in securing the elevating lever in various positions. The spring of the detent is indicated by the character 26'.

The frame 5 besides being supported by the bull wheel 19 is also supported by a grain wheel 27. The bull wheel 19 and the wheel 27 are journaled on axles 28 both having crank portions 29 and their free ends flattened and provided with apertures to receive cotter keys 30.

A bracket 31 is secured to one end of the frame 5 by bolts or like fasteners and includes a portion 32 which underlies the seed box and is bolted thereto. The bracket 31 further includes spaced plates 33 which straddle the end member of the frame 5 and project thereabove and one of said plates has formed therein axle-receiving openings 34 arranged at different elevations. The other plate 33 has provided therein pairs of interconnecting slots 35 arranged at different elevations and aligning with the openings 34 and the slots of each pair while connecting with each other are arranged at right angles for the purpose of receiving the flattened end of the axle of the wheel 27. It is to be understood that when the flattened end of the axle is received within one of the slots of the pair of slots the crank will be disposed uppermost for the elevation of one end of the frame and when the flattened end of said axle is positioned in the other slot of said pair of slots the crank of the axle will be disposed horizontally lowering the frame 5. Thus it will be seen that the pairs of slots at different elevations to receive the crank portions of the axles provides means whereby the frame may have a maximum elevation with respect to the ground and a maximum lowering with respect to the ground with minimum adjustment between the extreme elevation and the extreme lowering of the frame. It is to be understood that after the axle has been inserted in any one of the slots the cotter key is placed through the flattened end to prevent withdrawal of the axle accidentally.

A bracket 36 including a vertical portion 37 and spaced horizontal portions 38 is provided for the opposite end of the frame to receive the axle of the bull wheel 19. The horizontal spaced portions 38 are bolted onto the frame 5, while the portion 37 is disposed vertically and has formed therein slots 39 arranged at different elevations and at right angles to each other. One pair of the slots are non-communicating while another pair communicate and are arranged at right angles to each other. The non-communicating pair of slots are arranged at right angles to each other. The pair of slots 39 are substantially in horizontal plane with the upper pair of slots in the bracket 31 while the pair of interconnecting slots in the portion 37 of the bracket 36 are in substantial horizontal alignment with the lower pair of slots in the bracket 31. Also mounted on the frame adjacent the bracket 36 is a bracket 40 having openings aligning with the slots 39 of the bracket 36 and the axle of the bull wheel is first passed through the openings of the bracket 40 and the flattened end is then inserted in any one of the selected slots of the bracket 36 for adjusting the position of the crank of the axle of the bull wheel to bring about raising and lowering of the frame in accordance with the raising and lowering thereof by the adjustment of the axle of the wheel 27. The mounting of the axles as described besides allowing for raising and lowering of the frame with respect to the ground also permits said axles and wheels to be easily detached from the frame when desiring to transport the device on a truck for the purpose of conserving space and weight in the handling of the device.

The adjustment of the axles in the brackets as described permits the raising and lowering of the frame and seed box without disturbing the normal horizontal position of these parts. However, should it be necessary to raise or lower the forward end of the frame 5 so as to bring the stripper bar and stripper cylinder in proper position with respect to the height of the grass which may be varying in a certain area, it can be easily brought about through the movement of the lever 24' in opposite directions. This adjustment of the forward end of the frame upwardly and downwardly need only be slight from the horizontal position in order to bring about efficient operation of the stripper cylinder and stripper bar on the grass or other growth. Heretofore it has been customary to depend on this type of adjustment for the entire raising and lowering of the device with respect to the grass and which has proven unsatisfactory owing to the fact that if the front end of the seed box and stripper bar are tilted too much away from a horizontal position the stripper cylinder and stripper bar will then fail to operate properly on the grass or other growth to remove seeds therefrom and to collect the seeds within the seed box. Through the use of the particular construction of axles and brackets therefor the raising and lowering of the frame and seed box can be carried out without the foregoing mentioned disadvantages and thereby permits the device to successfully operate or gather seed from grass or other growth which has extreme variance as to height.

Extending from the draft tongue 22 diagonally therefrom is a brace 41 which is secured to the frame 5 laterally of the attaching of the tongue to said frame for the purpose of overcoming side draft.

A device of the character described and shown in the drawings will permit the constructing thereof to a desirable width and a weight which will permit of the machine or device to be easily handled in the loading and unloading thereof onto a conveyor. Also the means of permitting the raising and lowering of the forward end of the frame may be carried out while the machine is in motion with an expenditure of a minimum amount of effort.

It is believed that the foregoing description, when taken in connection with the drawings will fully set forth the construction and advantages of this invention to those skilled in the art to which such device relates, so that further detailed description will not be required.

Having thus described my invention, what I claim is:

1. A seed harvester comprising a main frame, a seed box on said frame and including a mouth, a stripper cylinder journaled in the mouth of the box, a stripper bar carried by the box within the mouth thereof to coact with the stripper cylinder in removing seed from growth and the depositing of said seeds in the box, means for connecting a draft source to the main frame, wheels for supporting the opposite ends of the main frame, means for driving the cylinder by one of said wheels, axles for said wheels and including crank portions, brackets mounted on said frame and having slots at different elevations to receive the crank portions of the axles for the raising and lowering of the frame with respect to the ground.

2. A seed harvester comprising a main frame, a seed box on said frame and including a mouth, a stripper cylinder journaled in the mouth of the box, a stripper bar carried by the box within the mouth thereof to coact with the stripper cylinder in removing seed from growth and the depositing of said seeds in the box, means for connecting a draft source to the main frame, wheels for supporting the opposite ends of the main frame, means for driving the cylinder by one of said wheels, axles for said wheels and including crank portions, brackets mounted on said frame and having slots at different elevations to receive the crank portions of the axles for the raising and lowering of the frame with respect to the ground, said axles having flattened ends and provided with apertures to fit the slots, and cotter keys to extend through the apertured ends of the axles to prevent accidental withdrawal of the axles from the slots of the brackets.

HUGH ARMSTRONG.